United States Patent

[11] 3,596,731

[72] Inventor Douglas I. Fales
 Flint, Mich.
[21] Appl. No. 876,730
[22] Filed Nov. 14, 1969
[45] Patented Aug. 3, 1971
[73] Assignee General Motors Corporation
 Detroit, Mich.

[54] VEHICLE ROAD SPEED CONTROL SYSTEM
 3 Claims, 1 Drawing Fig.
[52] U.S. Cl. .................................................. 180/108,
 123/103
[51] Int. Cl. .................................................. B60k 15/00
[50] Field of Search .................................................. 180/108,
 105, 106, 107, 109, 110; 123/103

[56] References Cited
UNITED STATES PATENTS
3,189,120 6/1965 Bohl .............................. 180/108
3,368,640 2/1968 Bremer et al. ................ 180/108

*Primary Examiner*—Benjamin Hersh
*Assistant Examiner*—John P. Silverstrim
*Attorneys*—W. E. Finken and D. D. McGraw ABSTRACT: A system for maintaining a desired vehicle speed, with the desired speed being set through a self-tracking sensor. A vehicle road speed-responsive valve is connected to a tracking spring which is moved by a vacuum-operated servomotor under control of the valve so that the position of the tracking spring, and therefore the tension exerted by it, reflects vehicle speed. This tension is set by a valve and lock assembly when the system is energized, so that the control valve desired vehicle speed input is set. Another servomotor also operating under control of the control valve is connected to operate the vehicle engine throttle valve to maintain the desired vehicle speed substantially at the set speed.

Patented Aug. 3, 1971
3,596,731
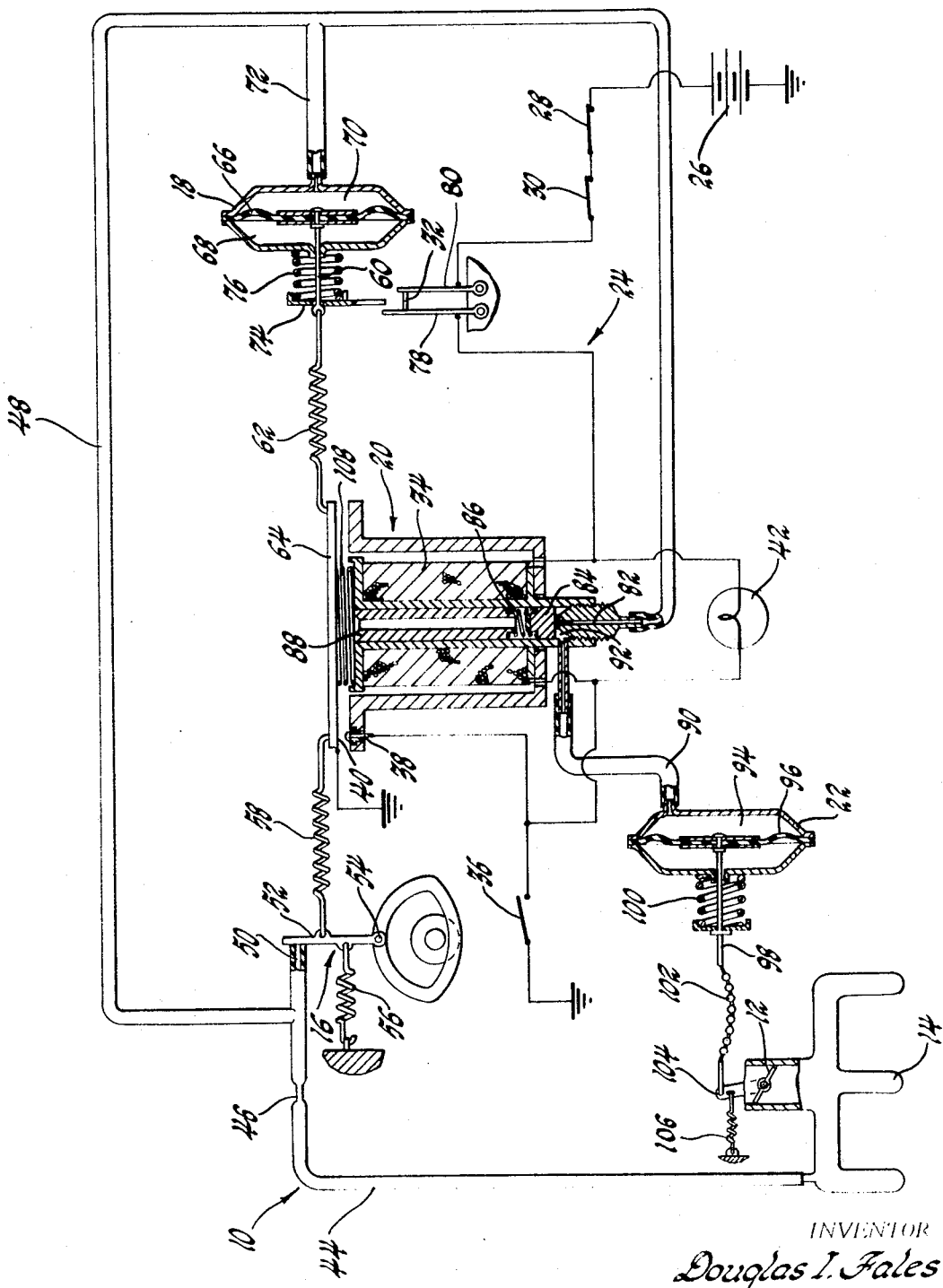
INVENTOR
Douglas I. Fales
BY
D. D. McGraw
ATTORNEY

VEHICLE ROAD SPEED CONTROL SYSTEM

The invention relates to a vacuum-operated vehicle road speed control system and more particularly to one of the self-tracking type in which a first vacuum-powered servomotor is positioned under influence of a control valve to establish a force acting on the valve responsive to vehicle speed. A second servomotor is connected to control the vehicle engine throttle when the system is energized so as to maintain the set speed. An inhibiting switch is also provided which deenergizes the system when there is insufficient vacuum present to provide adequate control.

IN THE DRAWING

The single FIGURE is a schematic representation of a system embodying the invention, with parts broken away and in section.

The vehicle road speed control system 10 includes a vehicle throttle valve 12 controlling the vehicle engine which has an intake manifold 14, a speed transducer and control valve assembly 16, a first servomotor 18, a valve and lock assembly 20, a second servomotor 22, and an electrical control circuit 24. Circuit 24 has a source of electrical energy schematically illustrated as battery 26 connected in series to the ignition switch 28, a normally closed brake switch 30, a normally closed inhibiting switch 32, the solenoid 34 of the valve and lock assembly 20, and the normally open engage switch 36. A hold switch is provided by contacts 38 and 40 which bypass the engage switch 36 to hold the electrical circuit engaged when solenoid 34 has been energized. An indicator lamp 42 is shown as being connected in parallel to solenoid 34 so that it is energized when the solenoid is energized.

The pneumatic circuit for the system includes the intake manifold 14 as a source of vacuum, connected by conduit 44 through restrictive orifice 46 to the control valve portion of assembly 16. Conduit 48 is connected to conduit 44 between orifice 46 and the port 50 of the control valve portion of assembly 16. The valve element 52 is schematically illustrated as being movable to modulate port 50, thereby modulating the amount of air at atmospheric pressure entering conduit 44. Valve element 52 is movable arcuately about its axis 54 in accordance with the vehicle speed. It is driven by an eddy current speedometer-type speed pickup arrangement or other suitable vehicle speed sensor. The valve element has a balancing spring 56 tending to keep it closed against port 50 and opposing movement of the speed pickup. The tracking spring 58 is attached to valve element 52 and acts in opposition to balancing spring 56. Tracking spring 58 is operatively connected to the output rod 60 of the first servomotor 18. This operative connection is made from output rod 60 through spring 62 and locking plate 64 to tracking spring 58. The servomotor rod 60 is connected to be moved by servomotor diaphragm 66, which divides the housing of servomotor 18 into an atmospheric pressure chamber 68 and a variable-pressure chamber 70. Chamber 70 is connected to conduit 48 by conduit 72 so that the pressure in chamber 70 is the same as the control pressure intermediate orifice 46 and port 50. A spring seat 74 is mounted on rod 60 and spring 76 acts on its seat 74 and the housing of servomotor 18 to urge rod 60 leftwardly, as seen in the drawing, against the differential pressure forces acting on diaphragm 66. The spring seat also acts to engage arm 78 of inhibiting switch 32 when rod 60 moves sufficiently leftward due to an insufficient pressure differential acting across diaphragm 66. The contacts of switch 32 are mounted on arm 78 and another arm 80 so that movement of spring seat 74, sufficiently far under influence of spring 76, will cause the switch 32 to be opened. Thus, when there is insufficient vacuum in the pneumatic circuit to properly operate the system, the system is deenergized. The system will be deenergized each time the ignition switch 28 is opened, the normally closed brake system is opened, or the normally closed switch 32 is opened.

Conduit 48 also is fluid connected with the outlet 82 of the valve and lock assembly 20. An on-off valve 84 is maintained in a normally closed position against the end of outlet 82 by means of spring 86. This spring is positioned against one end of the solenoid core 88. The conduit 90 is connected to the valve chamber 92 in which valve 84 is movable, and is also connected to the variable-pressure chamber 94 of the second servomotor 22. This servomotor is provided with a diaphragm 96 and an output rod 98 which are urged against the differential pressures acting thereon by spring 100. Rod 98 is connected through a suitable one-way connection, such as chain link 102, to the throttle valve linkage 104. A throttle valve-closing spring 106 acts on linkage 104 to urge the throttle valve to the closed position, as shown. When the variable pressure in chamber 94 acts on diaphragm 96 to move the diaphragm and rod 98 to the right, the slack in chain link 102 is taken up and the throttle valve 12 is opened against the force of its closing spring 106.

The locking plate 64 is positioned at one end of the valve and lock assembly 20 so that it is slightly spaced from the end of core 88. It is normally held in this relation by a light, free spring 108. Contacts 38 and 40 are respectively positioned on the assembly 20 and the locking plate 64 so that when solenoid 34 is energized, the locking plate 64 is moved against spring 108 and is held in position by the magnetic force of the solenoid. Contacts 38 and 40 also engage, thereby establishing a holding circuit around engage switch 36. The on-off valve 84 is also magnetically attracted toward core 88 against the force of spring 86, and opens to provide fluid connection from conduit 90 to conduit 48 through outlet 82.

When the vehicle is operating and the system is not energized, the tension of tracking spring 58 increases and decreases as the pressure differential acting on the first servomotor 18 increases and decreases, and the locking plate 64 moves linearly across the end of assembly 20. When the operator desires to energize the system, he closes engage switch 36. Since the vehicle brakes would normally be released at this time, switch 30 is closed. Also, sufficient vacuum is acting in the servomotor 18 to permit inhibiting switch 32 to be closed. There is no vacuum acting on the second servomotor, however, since valve 84 is closed. The closing of engage switch 36 energizes solenoid 34, opening valve 84 and locking the locking plate 64 in position. The holding circuit through contacts 38 and 40 is established so that when the operator releases switch 36, the system remains operative. Indicator lamp 42 is energized, indicating that the road speed system is engaged. With locking plate 64 held tightly in position, pressure changes in chamber 70 of the first servomotor 18 have no affect on tracking spring 58. The set tension on tracking spring 58 reflects the desired vehicle speed. The control pressure changes transmitted through conduits 48 and 90 to the second servomotor 22 act to control the throttle valve 12 to maintain the vehicle substantially at the desired speed. The vehicle operator deenergizes the system by opening the braking switch 30 through movement of the brake pedal in the brake apply direction, or by opening ignition switch 28. So long as the system is operating, spring 62 permits the first servomotor diaphragm 66 to move its rod 60 in accordance with pressure changes in conduit 48. The inhibiting switch 32 is opened by this movement when the control pressure approaches sufficiently close to atmospheric pressure to make it desirable to deenergize the system.

What I claim is:

1. A vehicle road speed control system comprising:
   a source of vacuum,
   a vehicle speed sensor,
   an engine throttle valve for controlling vehicle speed, and having a throttle valve-closing spring,
   a vacuum conduit connected at the outlet end thereof with said vacuum source and having in series restrictive orifice and an atmospheric pressure inlet,
   a control valve connected with said speed sensor to control said inlet as a function of vehicle speed nd having first means biasing said valve to close said inlet and second means biasing said valve to open said inlet, a first servomotor connected to said conduit fluidly intermediate said restrictive orifice and said inlet and having a first movable member operatively connected with said second biasing means to change the effective biasing force exerted by said second biasing means on said control valve in accordance with the pressure differential in said servomotor, a second servomotor connected in said conduit fluidly intermediate said restrictive orifice and said inlet and having a second movable member operatively connected with said throttle valve, for exerting a throttle valve-opening force in accordance with the pressure differential across said second movable members, a normally closed valve fluidly intermediate said conduit and said second servomotor, and selectively actuatable locking means connected to open said normally closed valve to lock said first movable member against movement by said first servomotor when said locking means is actuated, and to establish a biasing force exerted by said second biasing means on said control valve reflecting a desired vehicle road speed, said control valve then modulating the atmospheric pressure entering said inlet to generate a pressure differential acting on said second servomotor in opposition to said throttle valve-closing spring to maintain a substantially constant vehicle speed.

2. The vehicle road speed control system of claim 1 in which resilient means is connected intermediate said first servomotor and said first movable member to permit continued first servomotor movement, and means sensitive to sufficient movement of said first servomotor in response to a predetermined minimum vacuum in said conduit to deactuate said locking means.

3. The vehicle road speed control system of claim 1, said locking means including a solenoid said first movable member and second normally closed valve being magnetically attracted by energization of said solenoid to respectively lock said first movable member against movement and to hold said normally close valve open, and normally closed switch means responsive to said first servomotor below a predetermined minimum vacuum level to open and thereby deenergize said solenoid.

PO-1050
(5/69)

UNITED STATES PATENT OFFICE
CERTIFICATE OF CORRECTION

Patent No. __3,596,731__          Dated __August 3, 1971__

Inventor(s) __Douglas I. Fales__

It is certified that error appears in the above-identified patent and that said Letters Patent are hereby corrected as shown below:

Claim 1, column 2, line 7, after the word "series" insert -- a --.
Claim 1, column 2, line 10, the word "nd" should read -- and --.
Claim 1, column 3, line 10, the word "in" should read -- to --.
Claim 1, column 3, line 19, after the word "valve" insert -- and --.

Claim 3, column 4, line 19, the word "close" should read -- closed --.

Signed and sealed this 25th day of January 1972.

(SEAL)
Attest:

EDWARD M. FLETCHER, JR.
Attesting Officer

ROBERT GOTTSCHALK
Commissioner of Patents